United States Patent
Furman et al.

(10) Patent No.: US 7,512,197 B2
(45) Date of Patent: Mar. 31, 2009

(54) SYSTEM AND METHOD FOR REMOVING INTERFERING NARROWBAND SIGNALS FROM WIDE BANDWIDTH RECEIVE SIGNAL

(75) Inventors: William N. Furman, Fairport, NY (US); John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 861 days.

(21) Appl. No.: 11/052,312

(22) Filed: Feb. 7, 2005

(65) Prior Publication Data
US 2006/0176965 A1    Aug. 10, 2006

(51) Int. Cl.
*H03D 1/04* (2006.01)
(52) U.S. Cl. .................................... 375/346
(58) Field of Classification Search ............ 375/346
See application file for complete search history.

(56) References Cited

U.S. PATENT DOCUMENTS

| | | | |
|---|---|---|---|
| 5,612,978 A | 3/1997 | Blanchard et al. | 375/350 |
| 5,995,566 A | 11/1999 | Rickard et al. | 375/346 |
| 6,246,729 B1 | 6/2001 | Richardson | 375/324 |
| 6,426,983 B1 | 7/2002 | Rakib et al. | 375/346 |
| 6,975,673 B1 * | 12/2005 | Rouquette | 375/149 |
| 2004/0184550 A1 | 9/2004 | Yoshida et al. | 375/260 |

FOREIGN PATENT DOCUMENTS

EP    1 361 669    11/2003

* cited by examiner

*Primary Examiner*—Kevin Y Kim
(74) *Attorney, Agent, or Firm*—Allen, Dyer, Doppelt, Milbrath & Gilchrist, P.A.

(57) ABSTRACT

In accordance with the present invention, the system and method removes interfering signals from a communications signal and includes a Fast Fourier Transform (FFT) circuit for taking the FFT of a received signal and segmenting the signal into segments. A frequency shifting circuit can shift each segment in frequency to place an interfering signal within a single FFT band to be later substantially nulled. An inverse FFT circuit can place the segments of signals back within the time domain.

35 Claims, 6 Drawing Sheets

SYSTEM AND METHOD FOR REMOVING INTERFERING NARROWBAND SIGNALS FROM WIDE BANDWIDTH RECEIVE SIGNAL

FIELD OF THE INVENTION

The present invention relates to the field of communications systems, and more particularly, the present invention relates to communications systems and related methods that remove interfering signals.

BACKGROUND OF THE INVENTION

All radio communications systems can be subject to interfering signals, most notably, narrowband signals that interfere with wideband communications signals, for example, spread spectrum signals. A number of traditional systems and methods exist for removing or excising unwanted narrowband signals when they are in the presence of a wider bandwidth communications signal. Typically, there are in general two popular, but different approaches used by those skilled in the art to remove unwanted narrowband signals from a wider bandwidth signal. In a first approach, time domain adaptive filtering is used. In a second approach, frequency domain nulling is used. Both of these approaches end up corrupting the desired signal, especially as the communications industry moves towards wider bandwidth, higher bit rate waveforms. In these more complicated waveforms, the corruptions can end up limiting the usefulness of the desired signal. This is becoming increasingly apparent as advances are made in these wide bandwidth communications systems.

As is known by those skilled in the art, adaptive filtering takes advantage of the nature of narrowband signals, i.e., the correlation properties of these signals, which distinguish them from wide bandwidth information-bearing signals and noise signals. It is possible with adaptive filtering to suppress the narrowband components while only slightly affecting the wideband components (i.e., wideband signals and noise).

Thus, adaptive filtering can take advantage and exploit statistical properties of a sampled input signal. This can be accomplished, for example, by auto correlation, which refers to how recent samples of a waveform resemble any past input samples. It is also possible to use an adaptive predictor. Using a time delay and a primary and reference input, it is possible to form an auto correlation offset, representing the time difference used to compare past input samples with present samples. The amount of delay is chosen so that desired components and an input signal correlate with themselves and the desired end components do not.

LMS algorithms can also be used in conjunction with a Finite Impulse Response (FIR) filter for adjusting coefficient values and a delay relative to each other and other system components. A Finite Impulse Response filter can also be used in association with an error signal to train a series of adaptive taps to null any narrow bandwidth interference. These types of systems provide some advantageous suppression of interfering signals when a lower bit-rate and corresponding less-dense signal constellations are used. These systems do not work well, however, with higher bit-rate, denser constellations because the adaptive filter corrupts and removes desired receive signal energy. Also, some adaptive filters work well when the received communications signal and the jamming or interfering signal are unequal, i.e., the jamming or interfering signal is quite large compared to the received communications signal. If the two signals are about the same, the adaptive filtering technique often fails.

Examples of prior art adaptive filtering, interference suppression systems are disclosed in U.S. Pat. No. 5,426,983 to Rakib et al. and U.S. Pat. No. 5,612,978 to Blanchard et al.

Other interference suppression systems have used Fourier transforms, for example, the Discrete Fourier Transform (DFT) and digital signal processing circuitry which sample signals as a block transform. These systems can convert a block of N input samples into a block of N output bins, which represent the frequency spectrum of the sampled signal. The frequency bins can have a real part and an imaginary part and sophisticated DSP calculations can involve a convolution sum with bins evenly spaced in frequency. For example, U.S. Pat. No. 6,246,729 to Richardson discloses a system that transforms windowed data into real and imaginary frequency components.

Discrete Fourier transforms can have rectangular, triangular, Blackman, Hamming and Hanning window functions. It is possible to reconstruct a time-domain signal using the Discrete Fourier Transform and the Inverse Discrete Fourier Transform (DFT/IDFT). This type of relationship does not alter the signal, but only alters the different ways the signal is represented mathematically.

Using the original equations which define the DFT, it is possible to exploit the symmetry in the computations and reduce computational cost significantly using decimation-in-time or decimation-in-frequency algorithms. These new transforms are referred to as the Fast Fourier Transforms (FFT).

In any FFT-based noise-reduction system, there could be some modification of the frequency-domain data, such as zeroing bins that exceed a predefined amplitude threshold or hard-limiting all or part of frequency domain bins. It is then possible to transform the modified data back to the time domain by performing an inverse FFT (IFFT). Although this approach provides some interference suppression, it may also corrupt the desired receive signal (where corruption effects include desired signal energy loss in zeroed bins). Corruption of the received signal is further increased when the interfering frequency is not centered on a bin. During processing, the interferer will spread over a number of frequency bins and elimination of the interferer will further corrupt the desired signal.

SUMMARY OF THE INVENTION

In view of the foregoing background, it is therefore an object of the present invention to provide a system and method that removes narrowband interference from a communications signal which overcomes the drawbacks of the interference spreading over a number of bins.

It is also an object of the present invention to provide a system and method for removing narrowband interference when the narrowband interference signal is about the same energy as the communications signal.

It is yet another object of the present invention to provide a system and method for removing narrowband interference from a wideband communications signal having a high bit rate and dense constellation.

These and other objects, features, and advantages in accordance with the present invention are provided by a system and method of removing narrowband interference by collapsing energy into a single bin. The system and method of the present invention determines the frequency of the interfering signal and changes the frequency slightly to null more effectively. It is particularly useful for removing interfering narrowband signals from wider bandwidth received signals. This type of system and method can also be used in a cosite interference reduction system.

The received signal is first rotated by a complex rotation vector (where phase increment value per sample is based on the measured frequency difference between the interferer and the target FFT bin frequency) to shift the interfering signal onto the nearest bin frequency of the FFT prior to executing the Fast Fourier Transform (FFT). This frequency shift suppresses the sin x/x sidelobes and allows the excision of the offending tone by zeroing only one bin in the frequency domain, thus minimizing distortion to the desired receive signal.

In one aspect of the present invention, the FFT is taken of a received signal. The peak is found and the interference determined by comparing the peak value to an average value. The frequency of interferer is estimated and the time domain signal rotated to shift the interfering signal onto the nearest bin frequency. The Fast Fourier Transform is taken and the bin is zeroed, i.e., nulled. The IFFT is then taken. This process is repeated until all interfering signals have been removed.

It is also possible to use overlapping FFT blocks or segments where the center fifty percent of the output samples after the narrowband excision process is completed are passed to the demodulator process. For example, one block or segment may be processed, followed by another segment.

An interferer, which can be quite challenging to eliminate, is a Frequency Shift Keying (FSK) interferer. For this particular interferer, the start and stop samples of each FSK symbol must first be estimated (i.e., estimate the baud rate of FSK signal) and each FSK symbol must then be rotated by appropriate frequency rotation so that all FSK tones (i.e., data) fall on the same bin location after the FFT. The present invention is still advantageous even when there is a 0 dB interferer, as compared to the more easily removable 30 dB interferer. To further improve the performance of the invention, the overlap method can be used where only the middle part of the FFT is kept after interference suppression. This requires proper buffering of input data when performing FFTs/IFFTs, etc. The overlap method could use other ratios and still be effective. Fifty percent is just an example.

In accordance with the present invention, the system removes interfering signals from a communications signal and includes a Fast Fourier Transform (FFT) circuit for taking the FFT of a received signal and segmenting the signal into segments. A frequency shifting circuit can shift each segment in frequency to place an interfering signal within a single FFT bin to be removed (i.e., nulled) later. An inverse FFT circuit can place the segments of signals back in the appropriate place in the time domain.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
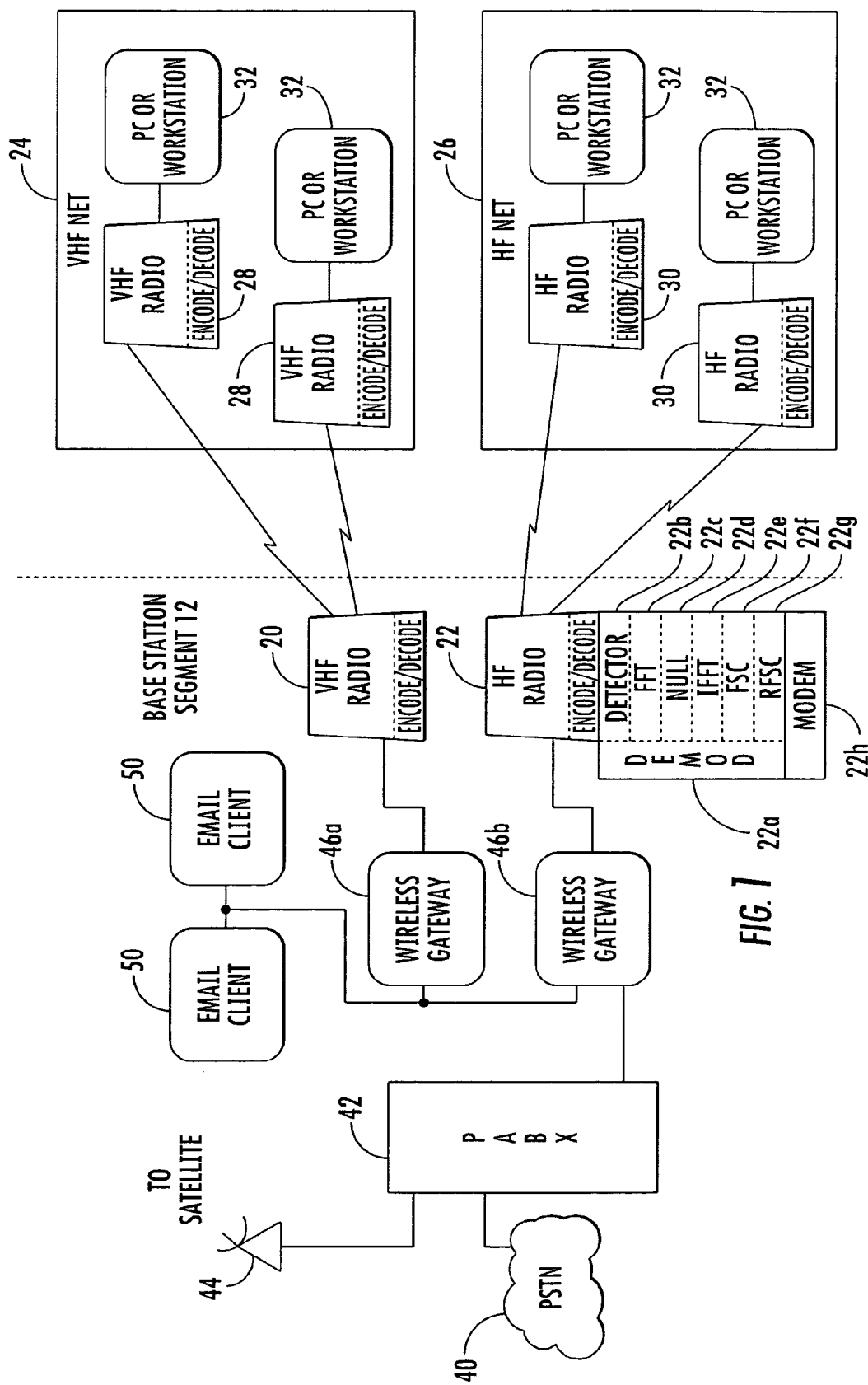
FIG. 1 is a block diagram of a communications system that can be used for the present invention as a non-limiting example.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention overcomes the drawbacks of the prior art that attempt to remove unwanted narrowband signals when they are in the presence of a wider bandwidth communications signal. The present invention makes use of a property of the Fast Fourier Transform to more effectively eliminate unwanted narrowband signals while still minimizing the degradation to the desired signal. Many narrowband interference signals can be viewed as sinusoidal in nature. In general, the frequency spectrum of a narrowband tone will exhibit a sin x/x pattern in the frequency domain due to the inherent block windowing of a finite duration observation, essentially spreading the effect of the narrowband signal across all frequencies. If the narrowband tone frequency is an integer multiple of the sampling rate/FFT size (i.e., bin spacing), then the sin x/x lobes are suppressed (i.e., FFT sin (x)/x sidelobes are sampled at zero crossings). In the present invention, the received signal is shifted in frequency so that the interferer frequency becomes an integer multiple of the sampling rate/ FFT size, suppressing the sin x/x lobes and allowing the excision of the offending tone by simply zeroing one bin in the frequency domain.

In the present invention, an FFT is taken of the received signal to estimate the frequency of interferer. By scanning the FFT output, a peak is found and the interference is determined by comparing the peak value to an average value. The frequency of interference is estimated and the original time domain received signal is rotated by the proper frequency value in order to shift the interferer onto the nearest bin frequency. Then the FFT is taken of this adjusted signal, the bin is zeroed, and the inverse FFT taken. This process is repeated until all interferers have been removed. To further improve the effectiveness of the invention, the use of overlap FFT blocks or segments can be used. Recommended overlap is about fifty percent, but other values can be used as well.

A frequency estimator can be used to estimate the frequency of a narrowband tone interferer. The received signal is time domain frequency rotated or shifted to place the interferer onto a FFT bin frequency, suppressing the sin x/x spectral pollution of the interferer. A frequency domain interferer is cancelled by nulling or zeroing the FFT bin associated with the interferer. It is necessary to then time domain frequency rotate or shift the processed received signal to restore the original frequency components of the desired received signal. The iterative process described previously should be applied to null or cancel all the interferers.

An interferer, which can be quite challenging to eliminate, is a Frequency Shift Keying (FSK) interferer. For this particular interferer, this system of the invention must estimate the start and stop samples of each FSK symbol (i.e., determine the baud rate of FSK signal) and rotate each FSK symbol by appropriate frequency rotation so that all FSK tones (i.e., data) fall on the same bin location after the FFT. The present invention is still advantageous even when there is a 0 dB interferer, as compared to the more easily removable 30 dB interferer. To further improve the performance of the invention, the overlap method can be used where only the middle part of FFT is kept after interference suppression. This requires proper buffering of input data when performing FFTs/IFFTs, etc. Note that the overlap method could use other ratios and still be effective. Fifty percent is just an example.

For purposes of description only, a brief description of a type of communications system that would benefit from the present invention is described relative to a non-limiting example shown in FIG. 1. This high level block diagram of a communications system 10 includes a base station segment 12 and wireless message terminals that could be modified for use with the present invention. The base station segment 12 includes a VHF radio 20 and HF radio 22 that communicate and transmit voice or data over a wireless link to a VHF net 24 or HF net 26, each which include a number of respective VHF radios 28 and HF radios 30, and personal computer workstations 32 connected to the radios 28, 30. The HF radio can include a modem and includes a demodulator circuit 22a and appropriate detector circuit 22b, Fast Fourier Transform (FFT) circuit 22c, null circuit 22d, Inverse Fast Fournier Transform (IFFT) circuit 22e, frequency shift circuit (FSC) 22f, reverse frequency shift circuit (RFSC) 22g, and modem 22h. The reverse frequency shift circuit can also be referred to as a negative frequency shift circuit. These circuits operate to perform the functions necessary for the present invention. Other illustrated radios can have similar circuits. The base station segment 12 includes a landline connection to a public switched telephone network (PSTN) 40, which connects to a PABX 42. A satellite interface 44, such as a satellite ground station, connects to the PABX 42, which connects to processors forming wireless gateways 46a, 46b. These interconnect to the VHF radio 20 or HF radio 22, respectively. The processors are connected through a local area network to the PABX 42 and e-mail clients 50. The radios include appropriate signal generators and modulators.

An Ethernet/TCP-IP local area network could operate as a "radio" mail server. E-mail messages could be sent over radio links and local air networks using STANAG-5066 as second-generation protocols/waveforms (the disclosure which is hereby incorporated by reference in its entirety) and, of course, preferably with the third-generation interoperability standard: STANAG-4538, the disclosure which is hereby incorporated by reference in its entirety. An interoperability standard FED-STD-1052 (the disclosure which is hereby incorporated by reference in its entirety) could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

It should be understood that many narrowband jamming or interference signals can be viewed as sinusoidal in nature. In general, the FFT based frequency spectrum of a narrowband tone will exhibit a (sin x/x) pattern in the frequency domain due to the inherent block windowing of a finite duration observation, essentially spreading the effect of the narrowband signal across all frequencies.

If the narrowband tone frequency is an integer multiple of (sampling rate/FFT size) then the (sin x/x) lobes are suppressed, and all of the tone energy is collapsed into a single FFT bin. The system and method of the present invention takes the received signal and shifts the signal in frequency to an integer multiple of the sampling rate/FFT size, suppressing the sin x/x lobes and excising the offending tone by the zeroing of frequency bin in the frequency domain. By zeroing a single bin, minimal degradation is experienced by the desired communications signal.

Figure 2A:
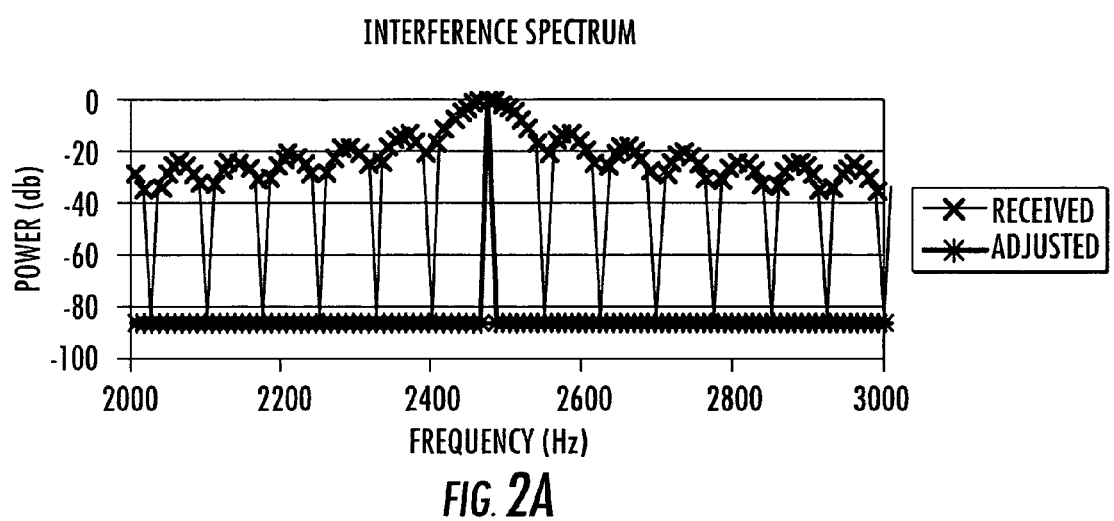
FIG. 2A is a graph of the power plot in the logarithmic domain of the FFT of a received interferer signal, in which the rectangular label stands for the original interferer signal tone with frequency chosen to not be a multiple of the FFT bin size and with an implicit rectangular window (i.e., no window used prior to FFT), and the adjusted label is power spectrum after the system of the invention is applied to receive the signal prior to FFT (i.e., receive signal adjusted so that interferer signal falls in a single bin). (As can be seen, energy spillover of interferer signal whose frequency is not a multiple of FFT bin size is quite significant across the entire frequency spectrum.)

FIG. 2A is the power plot in the logarithmic domain of the FFT of a received interferer signal. The rectangular label stands for the original interferer signal tone with frequency chosen to not be a multiple of FFT bin size and with implicit rectangular window (i.e., no window used prior to FFT) and adjusted label is power spectrum after invention is applied to receive signal prior to FFT (i.e., receive signal adjusted so that interferer signal falls in a single bin). As can be seen, energy spillover of interferer signal whose frequency is not a multiple of FFT bin size is quite significant across the entire frequency spectrum.

FIG. 2A illustrates the FFT based spectrums of a single tone that is not a multiple of the sampling rate/FFT size, and the same tone after it has been shifted in frequency to be a multiple of the sampling rate/FFT size. FIG. 2A shows the difference between an improper alignment with a bin and the more desirable alignment shown on the graph as the adjusted signal. The power is expressed in a logarithm scale and frequency in hertz (Hz). The received signal is shown spread by the system and receiver when it is nulled, and the interferer is not a multiple of the sampling rate over the FFT size. As shown, there is a large amount of sin x/x "smearing." This shows that the interferer is spread over the bins in the FFT and is not properly excised. If before the FFT is taken, the frequency is adjusted properly as shown by the adjusted signal, all the energy can be placed into a single bin and that bin can be zeroed.

Figure 2B:
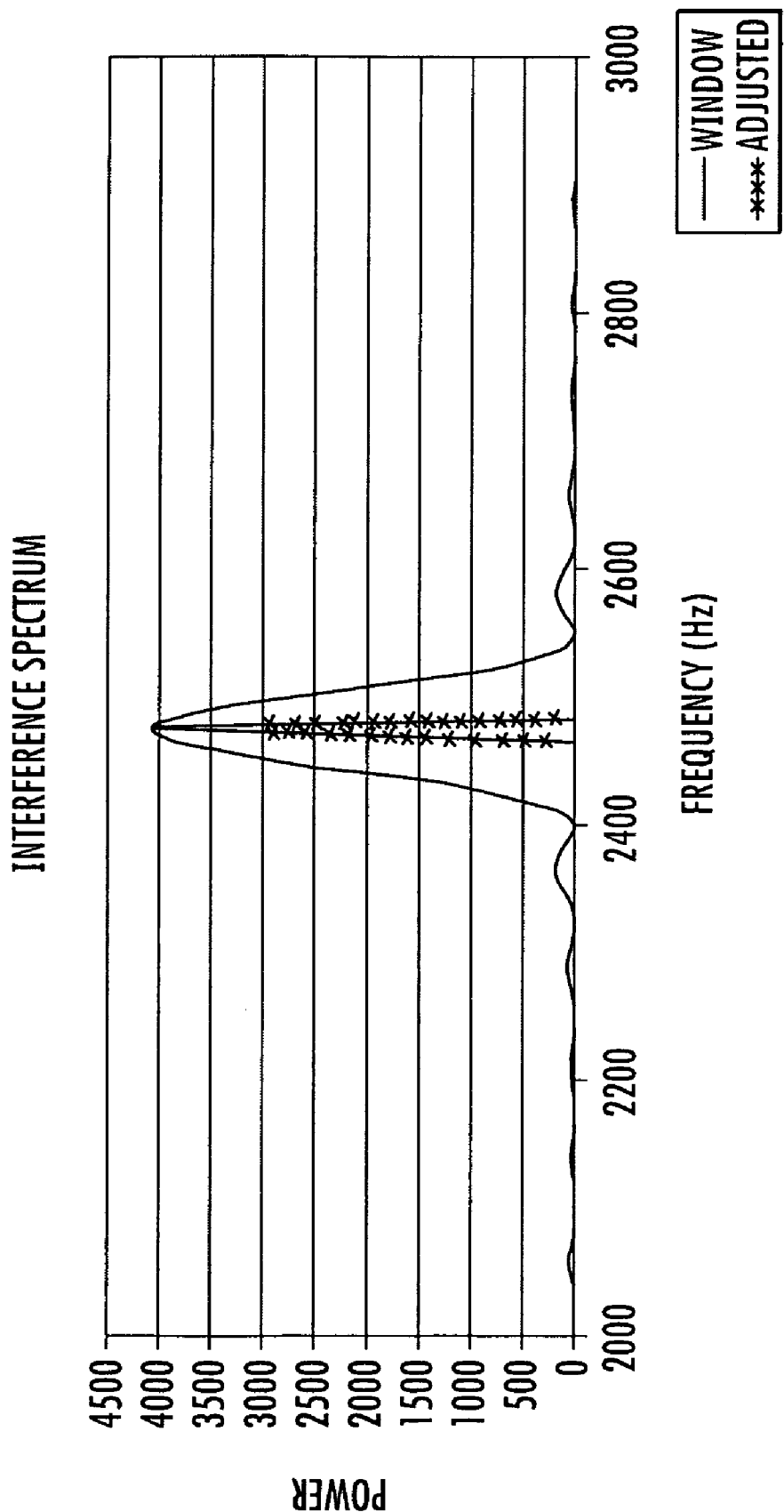
FIG. 2B is a graph similar to FIG. 1 but showing the actual power in a linear scale instead of a logarithmic scale.

FIG. 2B is another graph but with the power shown in a linear scale and not a logarithmic scale as in the example of FIG. 2A. In FIG. 2B, the window of the unadjusted signal is shown spread while the adjusted signal is placed substantially in one bin.

Figure 3:
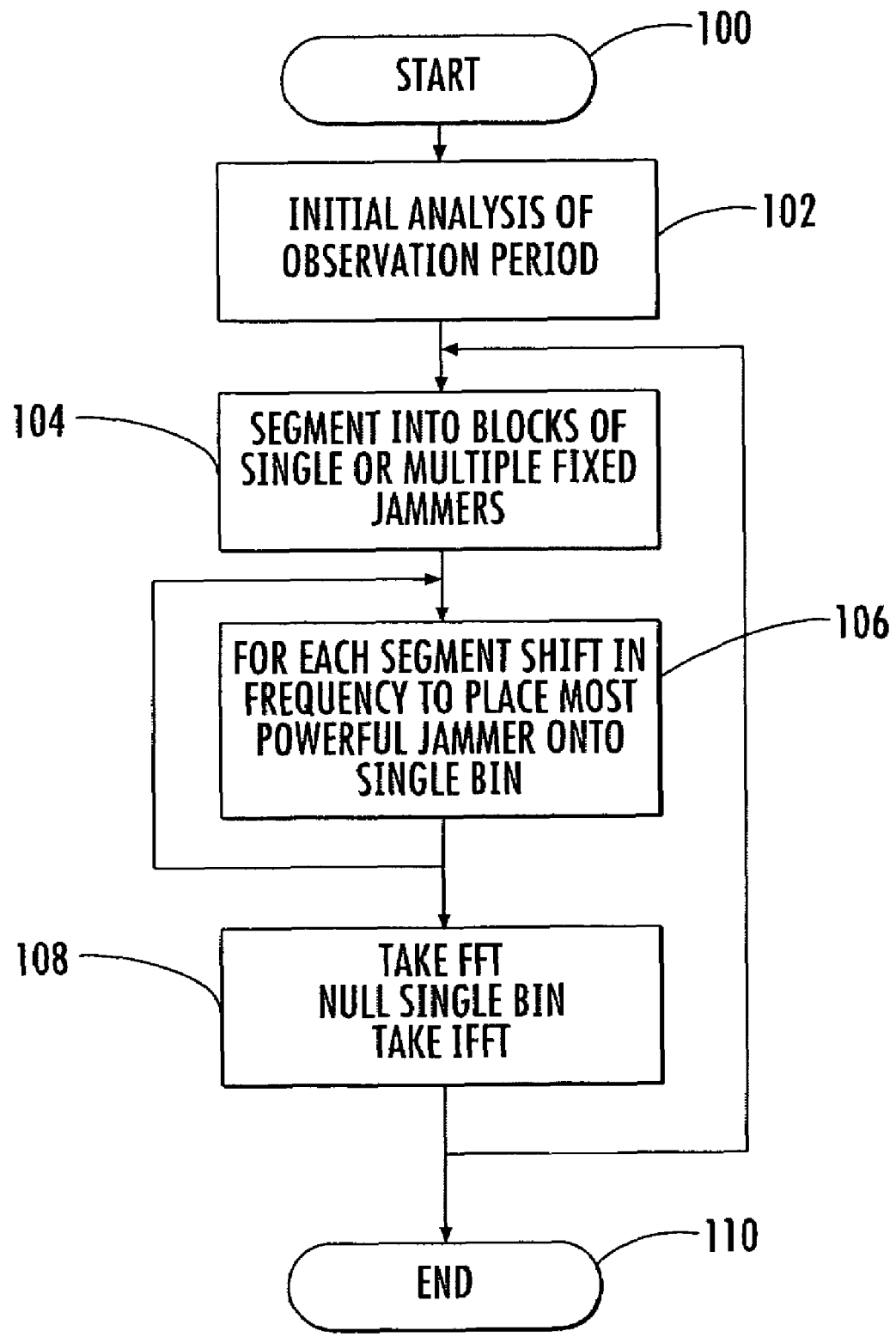
FIG. 3 is a high level flowchart showing an example of the sequence of steps that can be used in the system and method of the present invention.

FIG. 3 is a flowchart outlining an example of the processing that can be used in accordance with the present invention. The process begins (block 100) as an initial analysis is made within an observation time period (block 102). Data is segmented into blocks of single or multiple fixed jammers corresponding to the narrowband interference (block 104). For each segment, the system shifts in frequency the segment to place the most powerful jammer onto a single bin (block 106). This process can be repeated as necessary. At that point, the Fast Fourier Transform (FFT) is taken, a single bin is nulled, and the Inverse Fast Fourier Transform (IFFT) is taken to place the signal back in the time domain (block 108). This process is repeated as necessary and the process ends (block 110).

This flowchart indicates that the signal processing circuitry in any processor for the system and method of the present invention would process the block of samples and determine the jammer or interference characteristics that are present. Typical observations may be a single tone of a fixed frequency, two or more tones of a fixed frequency, or Frequency Shift Keying (FSK) style signaling where one tone is present for part of the observation followed by a separate tone for another piece of the observation. It is possible to use overlapping blocks. If the jammer signal is binary FSK, each baud interval would be processed as a separate block. Each segment is shifted in frequency to move the dominant jamming signal onto the same FFT bin frequency. Once this has been accomplished, an FFT is taken of the entire observation and the single bin containing the combined jamming signals is zeroed or nulled. This is followed by an Inverse FFT, and a rotation of each segment by the negative of the frequency shift originally used for that segment. In the case where multiple narrowband signals are present at the same time, an iterative approach may be used to null the largest and then the next largest, etc.

Figure 4:
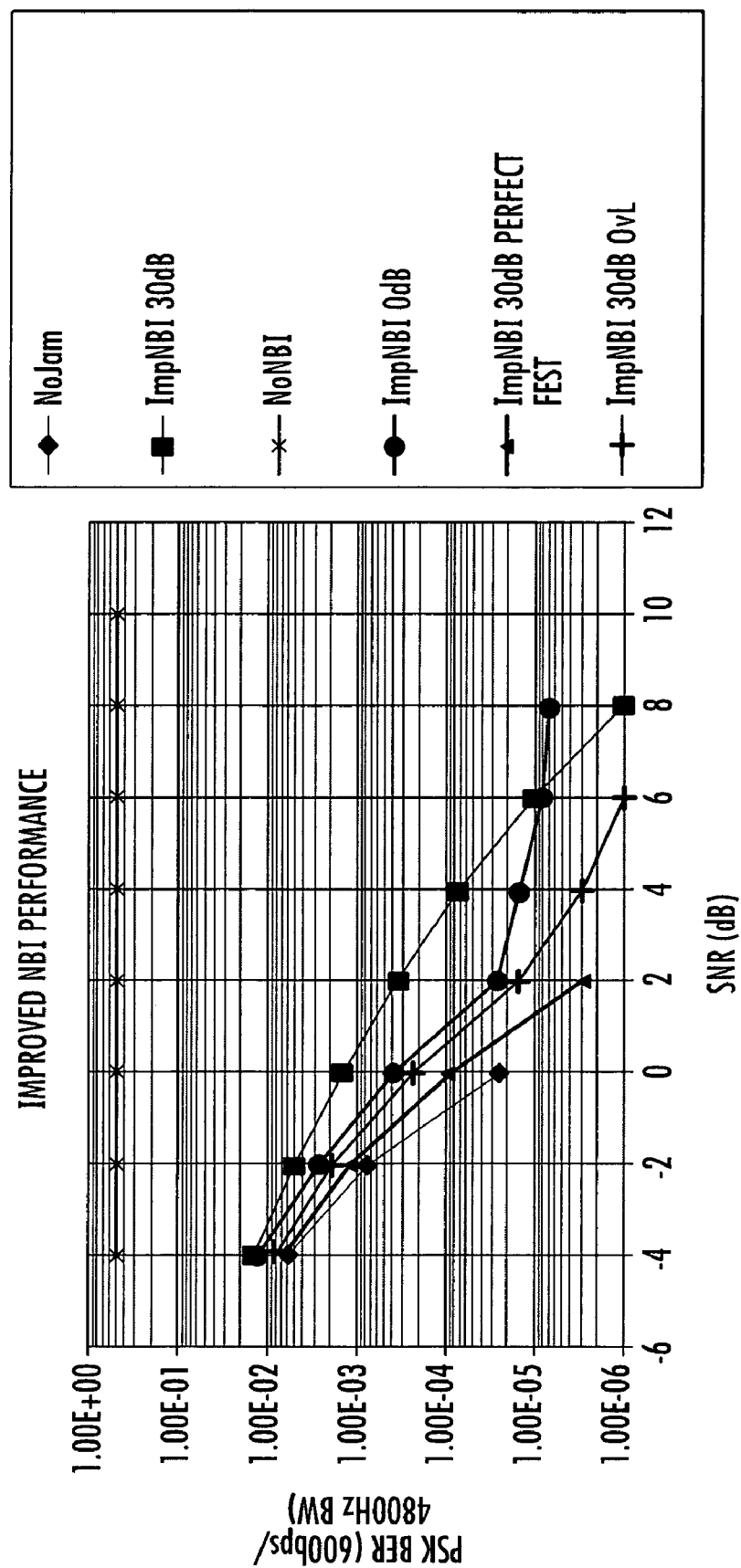
FIG. 4 is the plot of the bit error rate (BER) performance of a binary phase shift keyed (PSK) waveform versus the signal to noise ratio (SNR) for the original waveform (NoJam), for waveform plus interferer and no excision (NoNBI), and for various levels of interferer power (30 dB larger than signal and 0 db) and applying current invention. (OvL stands for overlap and shows performance using overlap method where the middle half of FFT output is used for final demodulation, instead of a full FFT output.)

FIG. 4 is the plot of the bit error rate (BER) performance of a binary phase shift keyed (PSK) waveform versus the signal to noise ratio (SNR) for the original waveform (NoJam), for waveform plus interferer and no excision (NoNBI), and for various levels of interferer power (30 dB larger than signal and 0 db) and applying current invention. (OvL stands for overlap and shows performance using overlap method where the middle half of FFT output is used for final demodulation, instead of a full FFT output.) This graph displays the performance of this approach when the desired signal is binary phase shift keyed (PSK) and a single tone jammer is present. FIG. 4 shows the improved narrowband interference. The top horizontal line indicates a large jammer signal and nothing is moved nor shifted in frequency. The line with the triangles shows the improved narrowband interference removal for the 30 decibels at a perfect estimation in which the frequency is aligned with the bin. This line shows perfect removal if the system could determine the exact interferer frequency. The diamond is more aligned with a better real world example. The Imp NBI 30 dB OvL line is an example of using overlap technique.

It is evident from FIG. 4 that without any narrowband removal, the desired signal experiences a fifty percent Bit Error Rate (BER). However with the present invention it is possible to receive the signal with only a 2 dB performance penalty, relative to WGN. This approach works for both a very powerful unwanted signal, for example a 30 dB Jammer-to-Signal Ratio (JSR), and a lower power jammer (0 dB JSR). Thus, the communications and the interference signal could be about equal in power, and the system and method of the present invention would still be applicable and remove the interfering signal. Traditional adaptive filter techniques do not usually work well when the JSR drops to a few dB or lower. It should be understood that a frequency estimation algorithm can be used. No knowledge of the actual tone frequency is required, however, if it is known apriori, this knowledge should be used.

Figure 5:
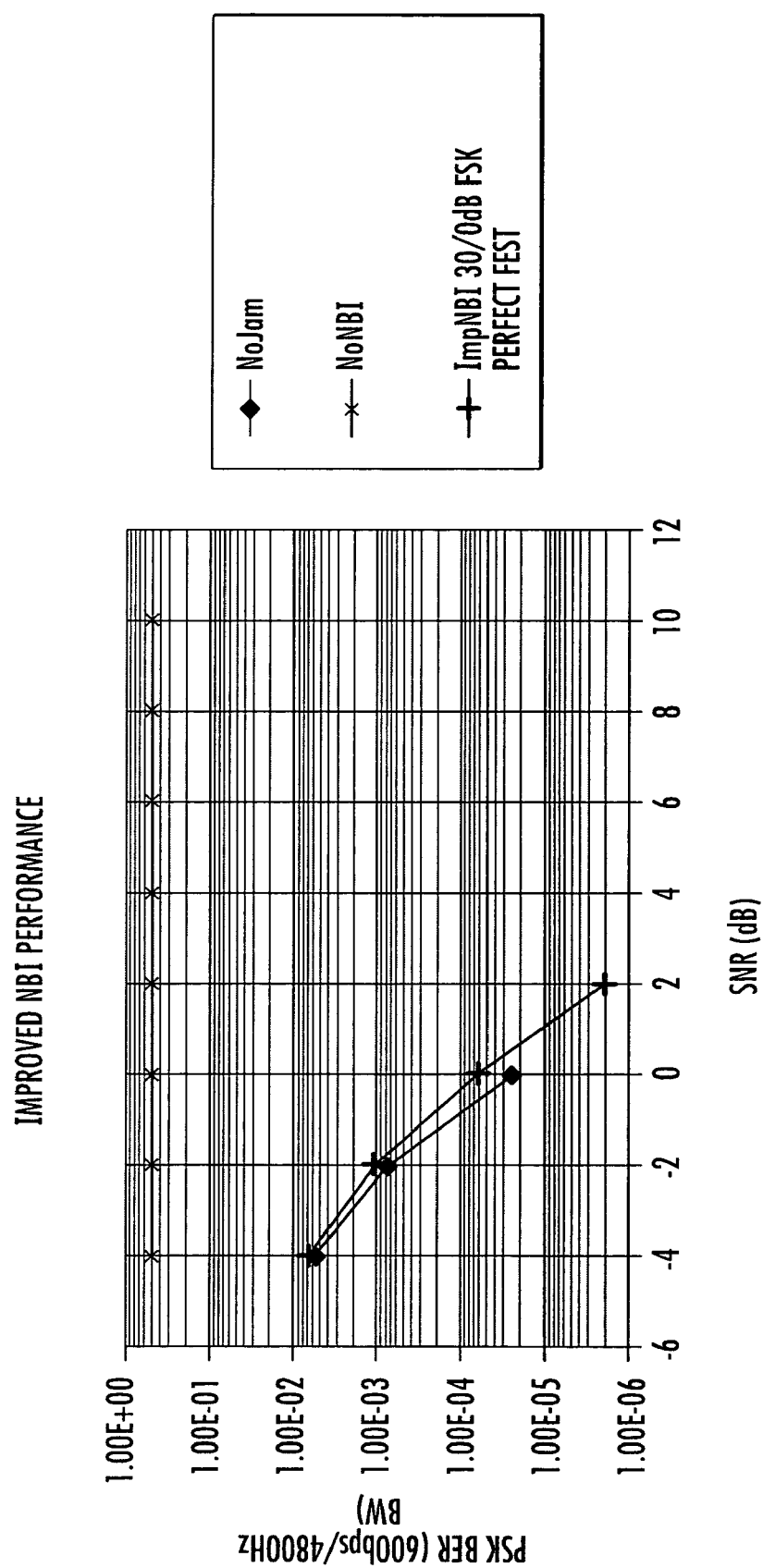
FIG. 5 is a graph similar to FIG. 4 showing an example of the improved narrowband interference performance for an FSK interferer using the system and method discussed for FSK of the present invention.

FIG. 5 is a graph demonstrating the performance of the system and method of the present invention in the presence of a frequency shift keyed (FSK) jammer. As evident, the graph shows the narrowband interference performance when the interference signal is not a tone, but was a modulated signal. In this example, the interference was frequency shift keying (FSK).

An important aspect of the present invention pertains to the area of nulling the frequency bins. Several techniques exist which can appear to be different but perform the same function. For example, instead of zeroing a bin, the amplitude of bin could be reduced to a level where tone no longer affects a demodulation process (call this almost nulling). Another example is the use of a digital filter having a frequency response which essentially performs the same function as nulling or almost nulling. An additional example is the generation of a negative interference tone (by simply keeping interferer tone, reversing phase by 180 degrees, zeroing all other bins, and then taking IFFT) and then adding this signal to received/rotated signal (of course a positive tone and subtracting could be used too).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A system for removing interfering signals from a communications signal, comprising:
    a Fast Fourier Transform (FFT) circuit for taking the FFT of a received signal and segmenting the signal into segments; and
    a frequency shifting circuit for shifting each segment in frequency an integer multiple of sampling rate divided by the FFT size and placing an interfering signal within a single FFT bin and later substantially nulling.

2. A system according to claim 1, and further comprising an Inverse FFT (IFFT) circuit for taking the Inverse FFT to place the segments of signals back within the time domain.

3. A system according to claim 1, and further comprising a reverse frequency shifting circuit that is operative for shifting each segment by a negative of the frequency shift originally used for shifting that segment.

4. A system according to claim 1, and further comprising a detector circuit for determining the frequency of an interfering signal within the communications signal.

5. A system according to claim 1, which further comprises a nulling circuit for substantially nulling an FFT bin in a frequency domain associated with an interfering signal.

6. A system according to claim 5, wherein said nulling circuit is operative for substantially nulling at least one FFT bin.

7. A system according to claim 1, wherein an interfering signal comprises a frequency shift keying (FSK) signal.

8. A system according to claim 1, and further comprising a circuit for reducing the amplitude of any interfering signals within the single FFT bin such that any interfering signals are substantially nulled and no longer affect a demodulation process.

9. A system according to claim 1, and further comprising a digital filter having a frequency response for substantially nulling any interfering signals within the single FFT bin.

10. A system according to claim 1, and further comprising a circuit for generating a negative interference signal and adding this signal to a received and rotated signal for substantially nulling any interference signals within a single FFT bin.

11. A system for removing interfering signals from a communications signal, comprising:
- a receiver for receiving a communications signal and including a detector circuit for determining the frequency of an interfering signal; and
- a frequency shifting circuit for shifting the received signal an integer multiple of a sampling rate divided by an FFT size for suppressing sin x/x lobes.

12. A system according to claim 11, which further comprises an Inverse FFT (IFFT) circuit for taking the Inverse FFT to place signals back within the time domain.

13. A system according to claim 11, and further comprising a reverse frequency shifting circuit that is operative for shifting a signal by the negative of the frequency shift originally used for that signal.

14. A system according to claim 11, and further comprising a detector circuit for determining the frequency of an interfering signal within the communications signal.

15. A system according to claim 11, which further comprises a nulling circuit for substantially nulling an FFT bin in a frequency domain associated with an interfering signal.

16. A system according to claim 15, wherein said nulling circuit is operative for substantially nulling at least one FFT bin.

17. A system according to claim 11, wherein an interfering signal comprises a frequency shift keying (FSK) interfering signal.

18. A system according to claim 11, and further comprising a circuit for reducing the amplitude of any interfering signals within a single FFT bin such that any interfering signals are substantially nulled and no longer affect a demodulation process.

19. A system according to claim 11, and further comprising a digital filter having a frequency response for substantially nulling any interfering signals within a single FFT bin.

20. A system according to claim 11, and further comprising a circuit for generating a negative interference signal and adding this signal to a received and rotated signal for substantially nulling any interference signals within a single FFT bin.

21. A method for removing interfering signals from a communications signal, which comprises:
- determining the frequency of an interfering signal within a communications signal; and
- shifting the frequency of the signal an integer multiple of a sampling rate divided by a Fast Fourier Transform (FFT) size to suppress sin x/x lobes.

22. A method according to claim 21, which further comprises substantially nulling a FFT bin in the frequency domain associated with the interfering signal.

23. A method according to claim 22, which further comprises substantially nulling a largest interfering signal followed by nulling a next largest interfering signal.

24. A method according to claim 21, which further comprises substantially nulling at least one FFT bin in the frequency domain.

25. A method according to claim 21, which further comprises shifting the frequency of the interfering signal onto a nearest FFT bin frequency.

26. A method according to claim 21, wherein the interfering signal comprises a frequency shift keying (FSK) signal.

27. A method according to claim 21, which further comprises time domain frequency shifting a signal after substantially nulling to restore original frequency components of a signal.

28. A method according to claim 21, which further comprises taking the Inverse Fast Fourier Transform (IFFT) of the interfering signal after substantially nulling to place the signal back in the time domain.

29. A method according to claim 21, which further comprises shifting the interfering signal by the negative of the frequency shift originally used for shifting the interfering signal.

30. A method according to claim 21, which further comprises reducing the amplitude of any interfering signals within a single FFT bin such that any interfering signals are substantially nulled and no longer affect a demodulation process.

31. A method according to claim 21, which further comprises substantially nulling interfering signals using a digital filter operative at a predetermined frequency response.

32. A method according to claim 21, which further comprises generating a negative interference signal and adding this signal to a received and rotated signal for substantially nulling any interfering signals within a single FFT bin.

33. A method of removing an interfering signal from a communications signal, which comprises:
- determining interfering signals within a communications signal;
- segmenting the interfering signals into segments;
- shifting each segment in frequency to place an interfering signal onto a single Fast Fourier Transform (FFT) bin;
- taking the FFT of the segment;
- substantially nulling a single FFT bin;
- taking the inverse FFT (IFFT) to place the signal back within the time domain; and
- repeating to remove substantially all interfering signals.

34. A method according to claim 33, which further comprises shifting the frequency of a signal an integer multiple of the sampling rate over the FFT size to suppress sin x/x lobes.

35. A method according to claim 33, which further comprises using overlapped FFT segments.

* * * * *